Sept. 6, 1932.   R. MANCHA ET AL   1,875,627
STORAGE BATTERY LOCOMOTIVE
Original Filed July 3, 1930   2 Sheets-Sheet 1
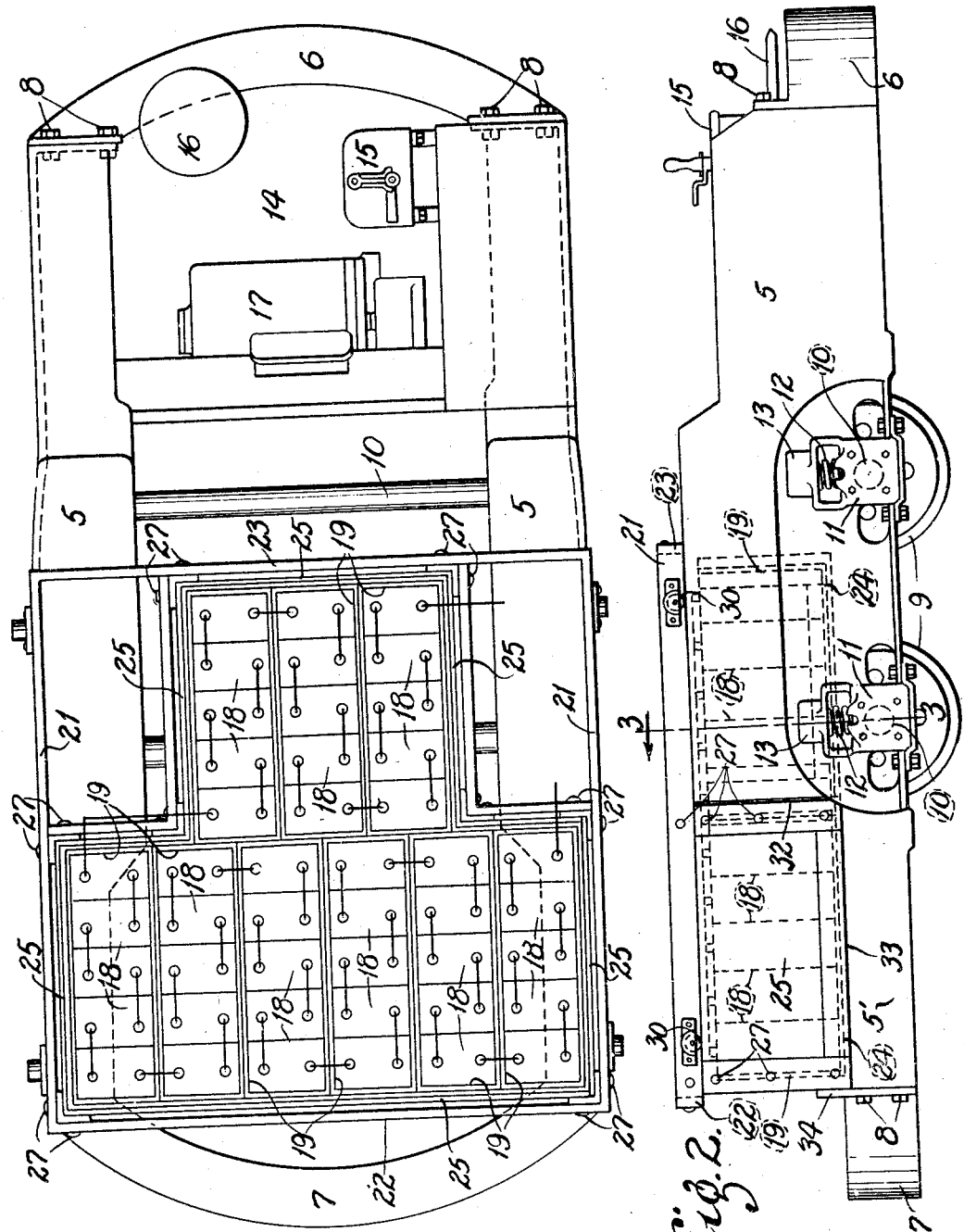
INVENTORS
RAYMOND MANCHA
CHARLES E. STOLTZ
BY Albert J. McCauley
ATTORNEY Sept. 6, 1932.  R. MANCHA ET AL  1,875,627
STORAGE BATTERY LOCOMOTIVE
Original Filed July 3, 1930  2 Sheets-Sheet 2
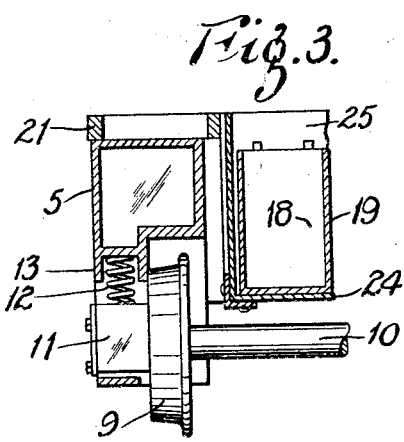
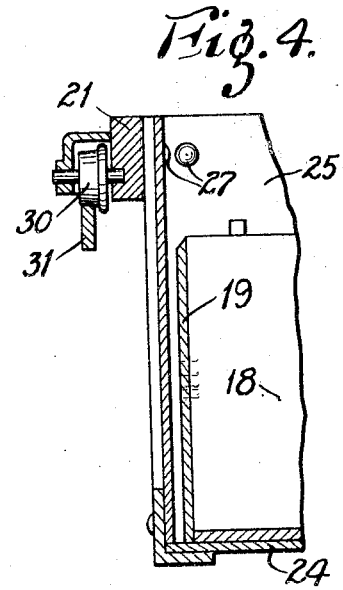
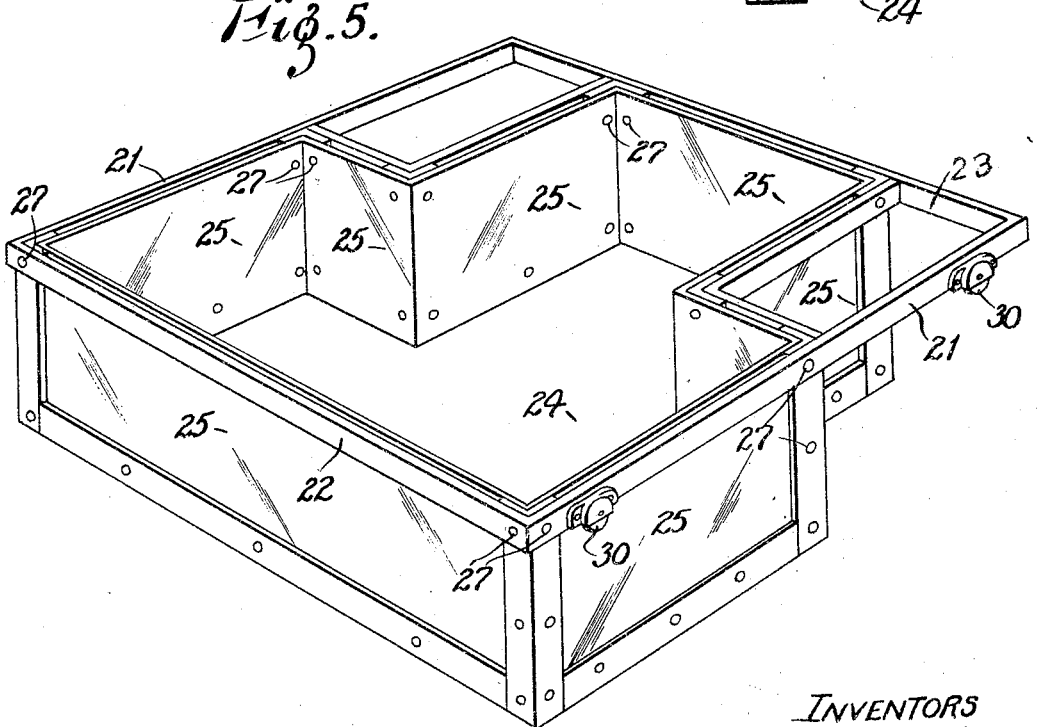
INVENTORS
RAYMOND MANCHA
CHARLES E. STOLTZ
BY Albert J. McCauley
ATTORNEY Patented Sept. 6, 1932

1,875,627

UNITED STATES PATENT OFFICE

RAYMOND MANCHA, OF ST. LOUIS, AND CHARLES E. STOLTZ, OF WEBSTER GROVES, MISSOURI, ASSIGNORS, BY MESNE ASSIGNMENTS, TO GOODMAN MANUFACTURING COMPANY, OF CHICAGO, ILLINOIS, A CORPORATION OF ILLINOIS

STORAGE BATTERY LOCOMOTIVE

Application filed July 3, 1930, Serial No. 465,498. Renewed November 19, 1931.

This invention relates to storage battery locomotives, and the novel features are especially advantageous in low type locomotives.

Prior to this invention, low type locomotives have been used in coal mines to draw coal cars through shallow tunnels, or passageways, that are very low. The storage battery has been surrounded by the chassis of the low type locomotive, but a battery of this kind consists of numerous cells connected together and the entire battery is very heavy, the weight being, for example, about two tons.

Owing to the weight of the battery, and the time required to disconnect and connect the numerous cells, the batteries in the old low type locomotives have not been removed for charging. It was necessary, or most economical, to charge the battery of an old low type locomotive without removing it from the chassis.

Consequently, when such low type locomotives were in continuous service, one would be idle for the charging of the battery while another was in service. In other words, two of the old low type locomotives were required to obtain the continuous service of a single locomotive.

An object of the present invention is to produce a low type locomotive wherein a novel chassis and two batteries are adapted to perform the work of two of the former low type locomotives.

More specifically stated, one of the objects is to produce a telescopic storage battery locomotive wherein a removable battery holder is telescoped with the new chassis, and so supported in the chassis that the discharged battery can be easily and quickly removed and replaced by a fully charged battery.

In the preferred form of the invention, the chassis includes side frame members in addition to a battery holder large enough and having the strength required to support the battery, said holder being seated on the side frame members and telescoped with the chassis to locate the battery in the desired low horizontal plane.

In removing the battery, the chassis may be moved with respect to the battery holder, or said holder may be moved independently of the chassis, so as to provide the telescopic motion which separates the chassis from the battery and its holder. A similar operation is performed in substituting a charged battery for the discharged battery.

The bottom of the removable battery holder may be lower than the tops of the wheels which support the chassis, and the telescopic holder may be seated upon relatively low portions of the side members in the chassis frame.

To illustrate one form of the invention, we have shown a chassis provided with a recess open at one end to receive the battery holder, and a battery holder having a relatively narrow portion located between and suspended from the side frames of the chassis, said holder having a wider portion extending across the chassis and seated upon low parts of the side frames. The battery and its holder are removably telescoped with the low chassis, and the weight of these removable elements is transmitted directly to the side members of the chassis structure.

With the foregoing and other objects in view, the invention comprises the novel construction, combination and arrangement of parts hereinafter more specifically described and illustrated in the accompanying drawings, wherein is shown the preferred embodiment of the invention. However, it is to be understood that the invention comprehends changes, variations and modifications which come within the scope of the claims appended.

Fig. 1 is a diagrammatical top view of a storage battery locomotive embodying the features of this invention.

Fig. 2 is a side view of the locomotive.

Fig. 3 is a section taken approximately on the lines 3—3 in Fig. 2.

Fig. 4 is a vertical section on a larger scale showing a portion of the battery holder removed from the locomotive.

Fig. 5 is a perspective view of the battery holder.

To illustrate one form of the invention, we have shown a storage battery locomotive including a chassis provided with side frame members 5, and end members 6 and 7 connecting the side members.

The end members 6 and 7 may be termed end sills and they are adapted to serve as bumpers. These end members may be provided with the usual, or any suitable, coupling devices (not shown) to couple the locomotive to a car, or to another locomotive. The top faces of the end members 6 and 7 are preferably lower than the tops of the side members 5, as shown in Fig. 2. Bolts 8, or other suitable fastening devices, may be used to connect the ends of the members 6 and 7 to the ends of the side members 5.

The chassis is supported on wheels 9 provided with axles 10 extending into journal boxes 11. Springs 12 are interposed between the journal boxes and spring pockets 13 formed in the side frame members 5, so the chassis frame is yieldingly supported on the journal boxes.

An operator's compartment 14 (Fig. 1) is formed in one end of the chassis, said compartment being provided with a controller 15 and an operator's seat 16 adjacent to the controller. We do not deem it necessary to show the brakes, nor the other equipment under the control of the operator, as the invention is not limited to such details.

The locomotive is driven by an electric motor 17, and the driving power may be transmitted from the motor to the wheels in any suitable manner.

The storage battery which energizes the motor consists of numerous cells 18 connected together in series and, as previously stated, the weight of the complete battery is very great, for example, about two tons.

As shown by Figures 1 and 2, the battery is telescoped with the chassis, and the tops of the cells are preferably lower than the top of the low type chassis, while the bottom of the battery is lower than the tops of the wheels, and preferably adjacent to the axles 10.

The cells 18 are arranged in rows and each row is located in a tray 19, but owing to the numerous electrical connections and the weight of the contents of each tray, the batteries of the old low type locomotives have not been removed for charging. The batteries in old locomotives of this type have been charged while confined in the locomotives, and this has resulted in the use of two complete locomotives whenever continuous service of one low type locomotive was required.

The battery holder comprises a rectangular abutment frame including a pair of side bars 21 arranged longitudinally of the chassis and seated upon the top faces of the main side frame members 5, said longitudinal bars 21 being connected by transverse bars 22 and 23 to produce the rectangular frame.

The battery compartment includes a bottom 24 on which the battery is seated, and side wall members 25 extending upwardly from said bottom and secured to the rectangular frame.

The battery compartment produced by the wall members 24 and 25 may be approximately T-shaped, as shown in Fig. 1 and Fig. 5, so as to extend across the chassis at the front portion of the locomotive, where the vertical wall members 25 lie adjacent to the frame members 21 and 22. Rivets 27, or other suitable attaching means, may be employed to connect said vertical wall members 25 to said frame members 21 and 22.

However, at the intermediate portion of the chassis (Figs. 1 and 3), where the main side frames 5 are relatively wide to form the wheel housings, the battery compartment is narrower than at the front of the locomotive.

At the extreme rear of the approximately T-shaped battery compartment (Fig. 1), the vertical wall 25 of said compartment may be connected directly to the rear bar 23 of the rectangular frame, by means of rivets 27, just as it is connected to the bars 21 and 22 at the front portions of the locomotive.

It will now be understood that the removable telescopic support shown in the drawings includes a bottom 24 on which the battery is seated, and that this bottom lies below the tops of the wheels 9 and preferably above the axles 10. Said bottom is preferably surrounded by the main frame of the chassis, so as to support the battery in the horizontal plane of this low chassis.

Each side frame 5 is recessed at one end to provide a vertical abutment shoulder 32 (Fig. 2) engaged by the wide portion of the battery holder. A horizontal member 5' extends forwardly from the bottom of said vertical shoulder 32 to provide a seat for the bottom of the wide portion of the battery holder. Said wide portion of the T-shaped compartment is thus seated on a low part of the chassis, and the seat 33 is lower than the tops of the wheels but higher than the axles.

However, the narrow portion of the battery compartment lies between, instead of above, the side frames 5, and this narrow portion is suspended from the bars 21 and 23 which rest upon the top faces of the side frames.

The chassis is thus formed with relatively high seats at the tops of the side frames from which a portion of the battery compartment is suspended, and lower seats 33 (Fig. 2) to receive the bottom of the battery compartment.

The side frames 5 are large castings, and owing to inaccuracies therein and to variations in the distance between the side frames, it is an advantage to locate the wide portion of said compartment in the open recesses in the front ends of said frames. This provides ample space for the battery without requiring accuracy in the space between the side frames.

An abutment flange 34 (Fig. 2) on the end sill 7 prevents forward displacement of the battery compartment, and the vertical shoulders 32 (Fig. 2) on the side frames prevent rearward displacement.

In removing the battery holder it is lifted a slight distance to locate the bottom of the battery compartment in a plane higher than the top of the abutment flange 34. A horizontal telescopic motion will then separate the locomotive from the battery.

The invention is not limited to any means for separating the telescopic elements of the locomotive structure, as this operation may be performed with the aid of jacks, or inclined tracks, and also by various other kinds of apparatus. However, the side frame members 21 of the removable structure may be equipped with wheels 30 adapted to support this structure at the charging station. This is suggested in Fig. 4 which shows one of the wheels 30 on a stationary track 31.

We claim:

1. A telescopic storage battery locomotive provided with a chassis including side frame members, a battery from which energy is transmitted to drive the locomotive, and a holder for said battery, said holder being telescoped with said chassis and the lower portion of said holder being removably seated on said side frame members to permit removal of said battery.

2. A telescopic storage battery locomotive provided with a chassis including side frame members, a storage battery from which energy is transmitted to drive the locomotive, and a holder for said battery, said holder being telescoped with the chassis to locate the battery in a low horizontal plane, said side frame having seats lower than the tops of the wheels of the locomotive, and said holder being removably supported on said seats to permit removal of said battery.

3. A telescopic storage battery locomotive provided with a chassis, a storage battery from which energy is transmitted to drive the locomotive, and a holder for said battery, said holder being telescoped with the chassis, and said chassis being provided with seats at different elevations on which said holder is removably supported to permit removal of the battery.

4. A low type storage battery locomotive provided with a chassis, a storage battery from which energy is transmitted to drive the locomotive, and a removable holder for said battery, a portion of said removable holder being suspended from said chassis, and another portion of said holder being seated on a relatively low part of said chassis.

5. A storage battery locomotive provided with a chassis, a storage battery from which energy is transmitted to drive the locomotive, and a removable holder for said battery, said removable holder having a portion telescoped with and suspended from said chassis and a portion seated upon a relatively low part of said chassis.

6. A telescopic storage battery locomotive provided with a chassis including side frame members, a storage battery from which energy is transmitted to drive the locomotive, and a holder for said battery, said holder being removably telescoped with the chassis to permit removal of the battery, said side frame members being provided with seats located in different horizontal and vertical planes, a portion of said holder being suspended from the relatively high seats and another portion of said holder being seated upon the lower seats.

7. In a telescopic low type storage battery locomotive, a chassis including side frame members, a storage battery from which energy is transmitted to drive the locomotive, and a holder for said battery, said holder having a relatively narrow bottom portion between said side frame members and a wider bottom portion removably seated upon said side frame members to permit removal of said battery.

8. In a telescopic low type storage battery locomotive, a chassis including side frame members, a storage battery from which energy is transmitted to drive the locomotive, and a holder for said battery, said holder having a relatively narrow bottom portion between said side frame members and a wider bottom portion removably seated upon said side frame members to permit removal of said battery, the side frame members being recessed to receive said wider bottom portion.

9. In a telescopic low type storage battery locomotive, a chassis including side frame members, a storage battery from which energy is transmitted to drive the locomotive, and a holder for said battery, said holder having a relatively narrow bottom portion between said side frame members and a wider bottom portion removably seated upon said side frame members to permit removal of said battery, said bottom portions being lower than the tops of the wheels of the locomotive, and each of the side frame members being recessed at one end to receive the relatively wide bottom portion.

10. In a telescopic storage battery locomotive, a chassis including side frame members each having an end portion lower than the tops of the wheels of the locomotive and a relatively high intermediate portion, a storage battery from which energy is transmitted to drive the locomotive, and a removable holder for said battery, said holder having a relatively narrow portion between the intermediate portions of said side frame members and a wider portion removably seated on said low end portions of the side frame members.

11. A storage battery locomotive provided with a chassis, a storage battery from which energy is transmitted to drive the locomotive, a removable holder for said battery, said removable holder having a relatively narrow portion telescoped with and suspended from said chassis, and a relatively wide portion seated upon a part of the chassis lower than the tops of the wheels of the locomotive and an abutment co-acting with said relatively wide portion to retain the removable support in place while said locomotive is in service.

12. A storage battery locomotive provided with a chassis, a storage battery from which energy is transmitted to drive the locomotive, and a removable T-shaped compartment for said battery, said removable compartment being extended across and seated upon the chassis at the front portion of the locomotive and telescoped with an intermediate portion of the chassis.

In testimony that we claim the foregoing we hereunto affix our signatures.

RAYMOND MANCHA.
CHARLES E. STOLTZ.